Oct. 5, 1965    R. D. QUINTON    3,210,003
RADIATOR SHUTTER MECHANISMS
Filed May 20, 1963    6 Sheets-Sheet 1
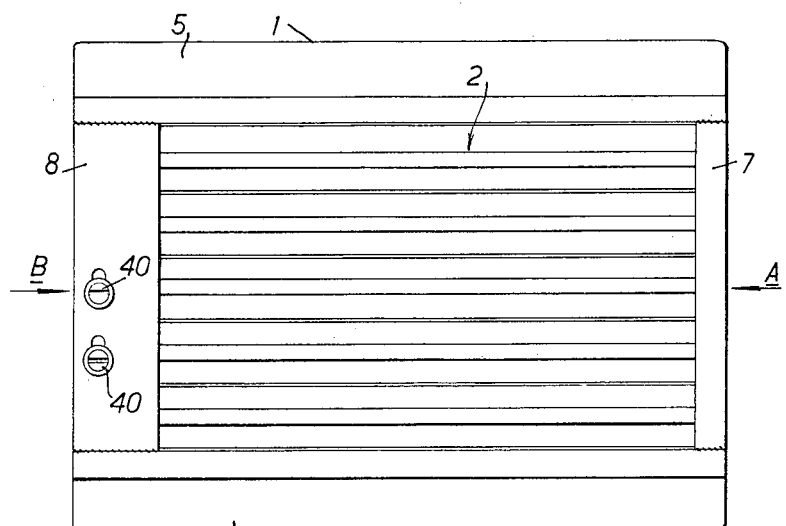
FIG. 1.
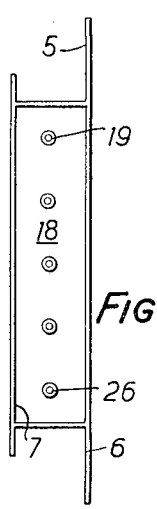
FIG. 2.
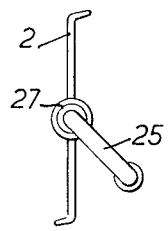
FIG. 7.
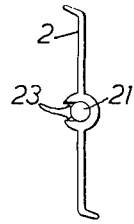
FIG. 8.
FIG. 6.
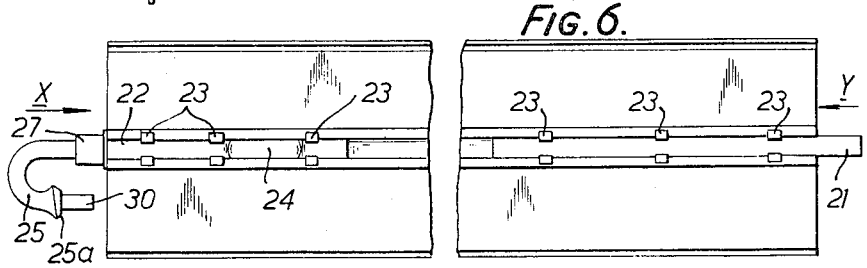
INVENTOR
REGINALD DOUGLAS QUINTON
BY Hane and Nydick
ATTORNEYS INVENTOR
REGINALD DOUGLAS QUINTON
BY Haire and Hjdink
ATTORNEYS

INVENTOR.
REGINALD DOUGLAS QUINTON

Oct. 5, 1965   R. D. QUINTON   3,210,003
RADIATOR SHUTTER MECHANISMS
Filed May 20, 1963   6 Sheets-Sheet 5
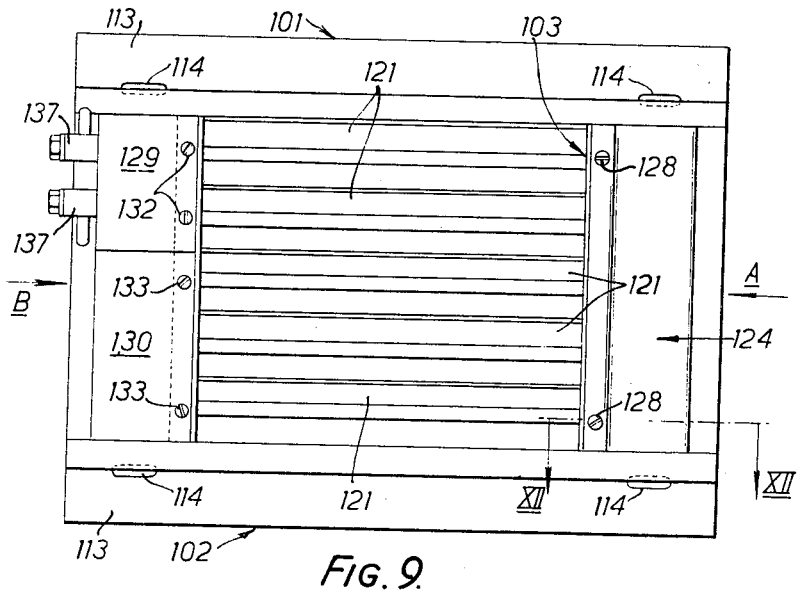
FIG. 9.
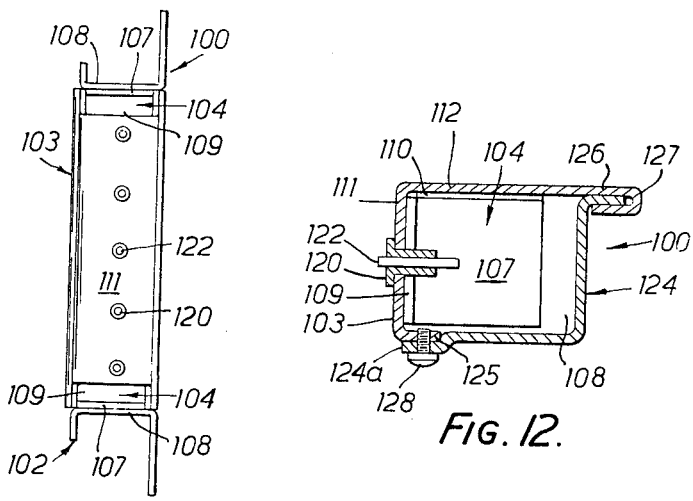
FIG. 10.
FIG. 12.
INVENTOR
REGINALD DOUGLAS QUINTON
By Hane and Nydick
ATTORNEYS Oct. 5, 1965    R. D. QUINTON    3,210,003
RADIATOR SHUTTER MECHANISMS
Filed May 20, 1963    6 Sheets-Sheet 6
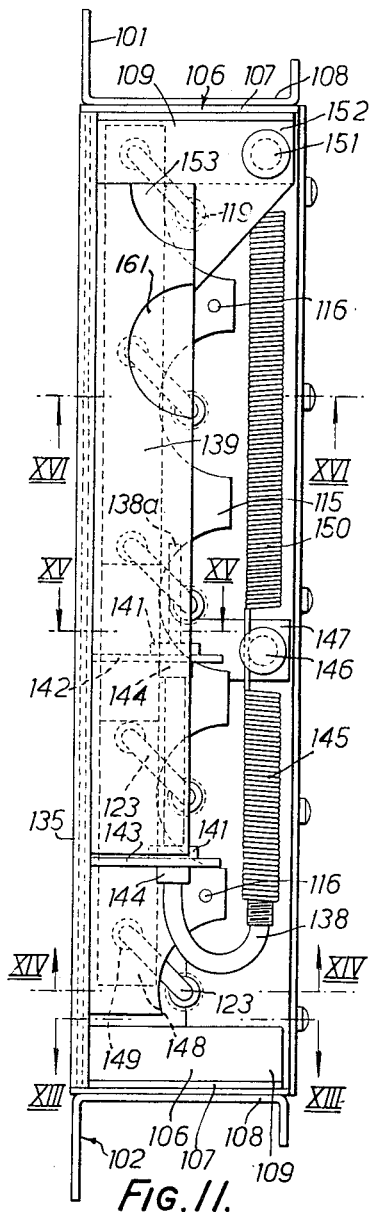
FIG. 11.
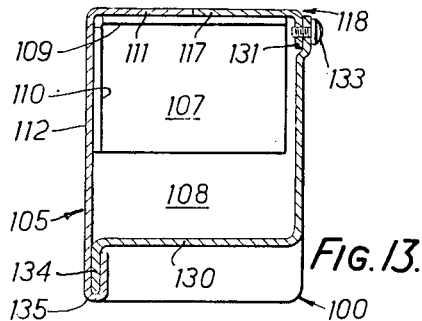
FIG. 13.
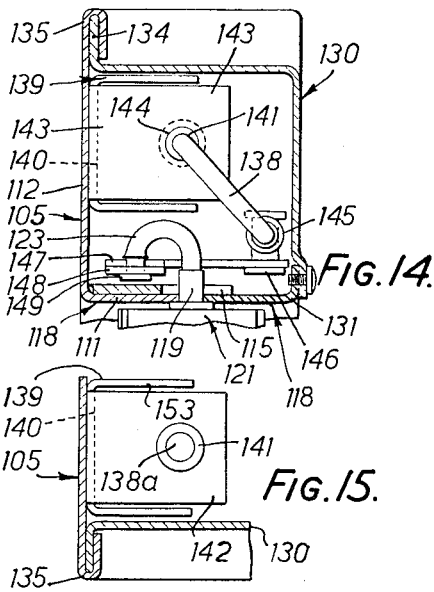
FIG. 14.
FIG. 15.
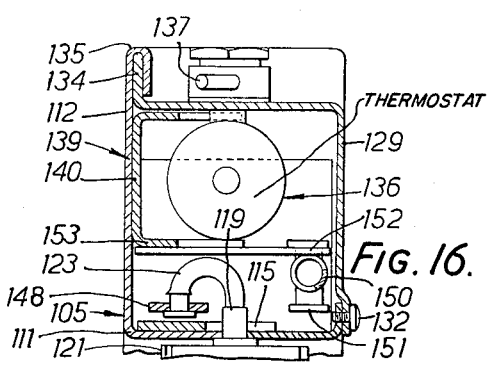
FIG. 16.
INVENTOR
REGINALD DOUGLAS QUINTON
BY Hane and Nydick
ATTORNEYS

United States Patent Office 3,210,003
Patented Oct. 5, 1965

3,210,003
RADIATOR SHUTTER MECHANISMS
Reginald Douglas Quinton, 3260 Cote Vertu, St. Laurent, Quebec, Canada
Filed May 20, 1963, Ser. No. 296,147
Claims Priority, application Great Britain, May 18, 1962, 19,363; July 9, 1962, 26,230
18 Claims. (Cl. 236—35.2)

This invention relates to radiator shutter mechanisms.

According to the present invention there is provided a radiator shutter mechanism for automatically controlling the passage of air to the radiator matrix of an engine in accordance with the cooling liquid temperature of the engine, comprising a frame, a plurality of vanes each having pivot rods at its opposite ends which are supported in opposite side members of the frame, one side member being constituted by a pair of parts having registering pairs of recesses, each registering recess pair providing a split bearing housing for a pivot rod, the provision of such split bearing housings permitting ready assembly of the vanes to the frame.

In order that the present invention may be well understood there will now be described two embodiments thereof, given by way of example only, reference being had to the accompanying drawings in which:

FIGURE 1 is a front view of a radiator shutter mechanism;

FIGURES 2 and 3 are end views of the same mechanism looking in the directions of arrows A and B respectively of FIGURE 1;

FIGURE 6 is an elevation of a vane unit;

FIGURES 7 and 8 are end views of the same vane unit looking in the directions of arrows X and Y respectively of FIGURE 6;

FIGURE 9 is a front view of another radiator shutter mechanism;

FIGURES 10 and 11 are end views of the same mechanism looking in the directions of arrows A and B respectively of FIGURE 9 with the covers at the ends A and B removed;

FIGURE 12 is a section along the line XII—XII of FIGURE 9; and

FIGURES 13, 14, 15 and 16 are fragmentary section views along the lines XIII—XIII, XIV—XIV, XV—XV and XVI—XVI of FIGURE 11, with the covers at the end B in position.

Figure 3:
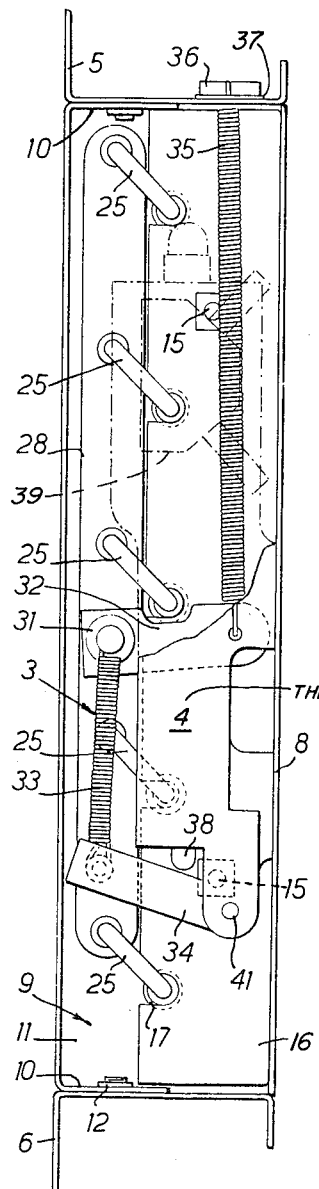
Figure 5:
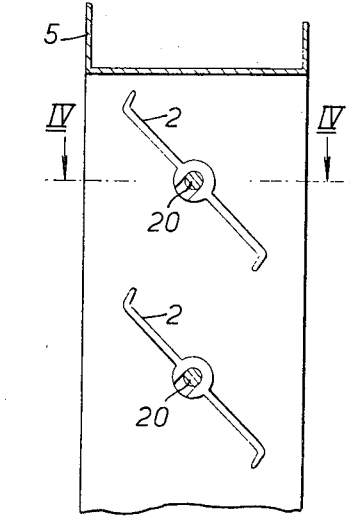
FIGURES 4 and 5 are fragmentary section views of parts of the same mechanism along the lines IV—IV of FIGURE 5 and V—V of FIGURE 4 respectively.
Figure 4:
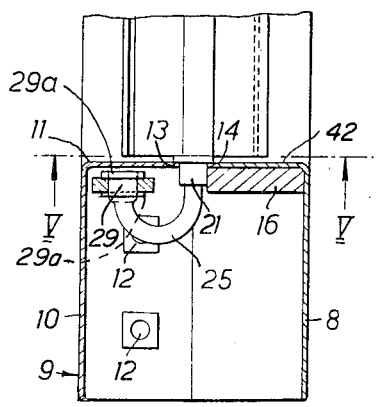

The radiator shutter mechanism can advantageously be employed with the engine of a road vehicle but is not limited to such use and can be utilised with other prime movers.

The radiator shutter mechanisms to be described are each operated in accordance with the temperature of the cooling liquid for the engine to vary the effective area of the vanes of the mechanism which restrict the passage of an air stream to the radiator matrix whereby to maintain the engine substantially at the optimum working temperature.

Referring first to FIGURES 1 to 8, the radiator shutter mechanism comprises a frame assembly 1, a series of vanes 2 mounted therein, and an actuator mechanism 3 including a temperature responsive device 4. The shutter mechanism is intended to be fitted in front of the radiator of a road vehicle with the device 4 connected into the water cooling system of the vehicle engine. As will appear, the arrangement is such that the device 4, in response to temperature changes of the cooling water effects pivotal movement of the vanes 2, thereby to vary the effective area of the vanes restricting the passage of cooling air to the radiator and automatically correct for such temperature variations. The engine is thus enabled to run at the optimum working temperature.

The frame assembly 1 includes upper and lower longitudinal members 5 and 6 respectively joined at one end, as by welding, to a vertical member 7, and at the other end, also suitably by welding, to a vertical member 8. The members 5, 6 and 7 are of generally channel section and the member 8 of angle section. Alternatively, the frame assembly could be of extruded aluminium. A member 9 formed from a plate bent over at its ends to provide flanges 10 and along one side to provide a flange 11, extends between longitudinal members 5 and 6, and is bolted thereto by screw and nut assemblies 12. The free edge of the flange 11 abuts that of the flange 42 of the member 8, and in these edges are formed five semicircular recesses 13 and 14 respectively, the recesses in the one registering with the recesses in the other to provide five circular bearing housings. To the outer face of the flange 42 is attached, as by screw and nut assemblies 15, a plate 16, the plate projecting above the free edge of the flange 42 and having five recesses 17 which terminate in semi-circular bases in register with the recesses 41, to provide a continuation of the other halves of the bearing housings. The flange 18 of the vertical member 7 includes five bearing receiving apertures 19 which register with the aforementioned bearing housings.

Each vane 2 has a thickened centre position in which is formed a U-shape channel 20. Rods 21 and 22 are located in opposite ends of the channel, and the side wall of the channel is crimped or cold forged on to the rods at 23 to hold them axially and rotationally fast in the channel. The rod 22 may be bent out of straight at 24 when crimping is adopted to provide an additional restraint against turning in the channel, and includes a U-shaped end part 25 having a coined head 25a from which extends an end part 30 of reduced diameter.

The vanes could also be roll formed in stainless steel. The vanes could be flanged to carry a rubber strip stuck on to the vane, the strips reducing vibration and improving the seal between vanes when the shutter mechanism is inoperative. The vanes could also be of plastic extruded on a rod core.

The rods 21 and 22 are journalled for rotation in bearing bushes 26 and 27 respectively. The bushes 26 are positioned in the bearing apertures 19, and include flanged heads which engage the inner face of the flange 18. The bushes 27 are carried by the U-shaped parts 25 of the rods 22 and also have flanged heads, the heads engaging behind the inner faces of the flanges 11 and 12, and the shanks of the bushes engaging in the bearing housings defined by the registering recesses 13 and 14 and semicircular bases of the recesses 17 in the plate 16. The vanes 2, are thus supported at their ends for pivotal movement.

The actuator mechanism 3 includes a floating link 28 having five apertures in which are positioned flanged bushes 29. The end parts 30 of the rods 22 are received in the bushes 29. The bushes 29 are arranged alternatively in positions in which the head 29a of one bush abuts the link 28 and lies between that link and the flange 11 (as shown), and the head of the next bush lies between the coined head 25a of the U-shaped part 25 carrying that bush and the flange 11, the bush being retained in position by the coined head. By this arrangement, there is no metal-to-metal contact between the floating link and the flange 11 or the coined head, the link being spaced from these parts and held in position by the bush heads 29a. As will be appreciated the length of each end part 30 is such that the end parts do not project outwardly of the bushes 29, to make contact with the flanges 11. A peg 31, carrying a plate 32, is fast in the link 28, and to the peg is anchored an end of a spring 33 of which the other end is anchored to a pivoted link 34 of the temperature responsive device 4. A return spring 35 is anchored at one end to the link 28 and at the other end to a part 36 which bears against a washer 37 which in turn engages against the web of the longitudinal member 5.

The temperature responsive device 4 preferably incorporates a wax hydraulic thermostat but may alternatively comprise a bellows arrangement, an evaporator fitted with a suitable volatile fluid being provided and so chosen that the fluid will evaporate at a given temperature of the cooling water and actuate the thermostat. Movement of the thermostat is transmitted through a piston head 38 to the link 34, the head bearing against the link but not being otherwise connected thereto. The water entry and the return parts of the device are shown at 39. The casing of the device is bolted at 40 to the vertical member 8, the member having slots for receiving the fixing bolts so as to permit of lengthwise adjustment of the device.

The bushes 26, 27 and 29 are preferably of nylon, polytetrafluorethylene or any suitable synthetic bearing material.

In use, the shutter mechanism is suitably attached at its frame assembly 1 to the vehicle.

The shutter mechanism operates as follows: assuming that the cooling water temperature rises to a degree at which to effect operation of the thermostat of the temperature responsive device, then the piston head 38 moves outwardly to pivot the link 34 anticlockwise as viewed in FIGURE 3 about its pivot 41. This movement of the link is transmitted through the spring 33 to the peg 31 and hence the link 28, to move the link to the left as viewed in FIGURE 3. The plate 32 is also moved and such movement is resisted by the return spring 35. As the link 28 moves to the left and down, it exerts a turning force on the U-shaped ends of the rods 22 thereby to pivot the vanes 2 anticlockwise as viewed in FIGURE 5 into an open position.

An airstream is thus able to pass through the shutter mechanism to the radiator matrix to correct for the rise in temperature of the cooling water, the mechanism being operated dependant upon the optimum working temperature of the engine to be obtained. Cooling of the water to the optimum temperature causes returning of the piston head 38, and the return spring 35 then urges the various parts of the actuator mechanism to the right as viewed in FIGURE 3 to return the vanes towards the closed position shown in FIGURE 1.

The shutter mechanism can be readily built-up and assembled. In construction, the longitudinal members 5 and 6 and vertical members 7 and 8 are united, bearing bushes 26 are pressed in position, and the plate 16 bolted to the member 8 to form a frame. Individual vane units comprising a vane 2, rods 21 and 22 and bearing bush 27 are made-up, and the units assembled to the frame by inserting their rods 21 in the bushes 26 and seating their bushes 27 in the recesses 14 and 17 in the flange 12 and plate 16 respectively. The actuator mechanism is assembled in position, and the assembly completed by fitting the member 9 between the longitudinal members to trap the bushes 27 in position and bolting in position to those members.

As will be realised such ease of assembly is rendered possible in particular by the split bearing housing construction comprising the lower housing half being the recesses 14 and 17 in the flange 12 and plate 16 respectively, and the upper housing half being the recesses 13 in the flange 11.

Whilst the temperature responsive device 4 has been described as fitted to the frame assembly 1, it may be mounted away from the frame, for example, on the cylinder block of the engine or in the head tank. In such a case, it would be necessary to provide means for transferring actuating movements to the shutter mechanism. A suitable means comprises a Bowden cable or a tube having an internal low friction liner in which is positioned a series of load transferring balls for receiving motion imparted by the temperature responsive device and transmitting such motion through any suitable means to the actuator mechanism.

As will be appreciated, by so positioning the temperature responsive device away from the frame assembly heat losses in the coooling water prior to the device are minimized enabling a more accurate control to be obtained.

The tube could be of flexible construction having a solder coating. Such a tube heated to make the solder soft could be shaped into the required configuration and would be set rigid in that configuration upon hardening of the solder. Mounting the device 4 away from the shutter mechanism has the advantage of enabling the vane length to be increased without increasing the overall width of the frame assembly; in addition by suitably positioning the device it is possible to obtain more ready access thereto.

Figure 3A:
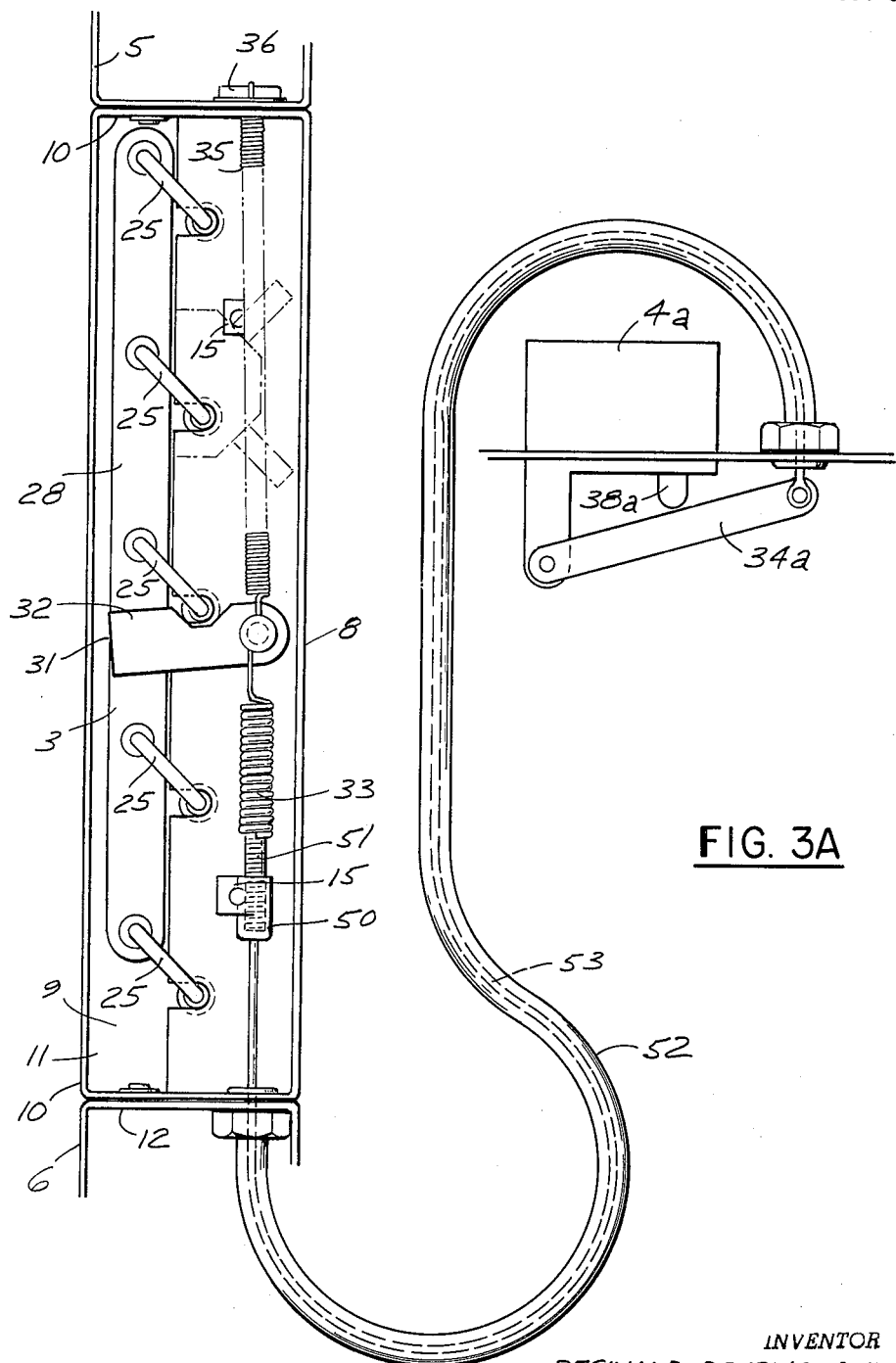
FIGURE 3A is a modification of the mechanism shown in FIGURE 3.

According to FIG. 3A a diagrammatically shown thermostat 4a is mounted spaced apart from the frame assembly. The temperature controlled arm 38a of the thermostat acts upon a pivotal lever 34a which in turn is connected to one end of the cable 53 of a conventional Bowden wire 52. The other end of the cable is connected by means of a screw bolt 51 held in a sleeve 50 to one end of spring 33, the other end of which is secured to plate 32. As is evident, the mechanism of FIG. 3A functions in the same manner as the mechanism of FIG. 3.

Figure 3B:
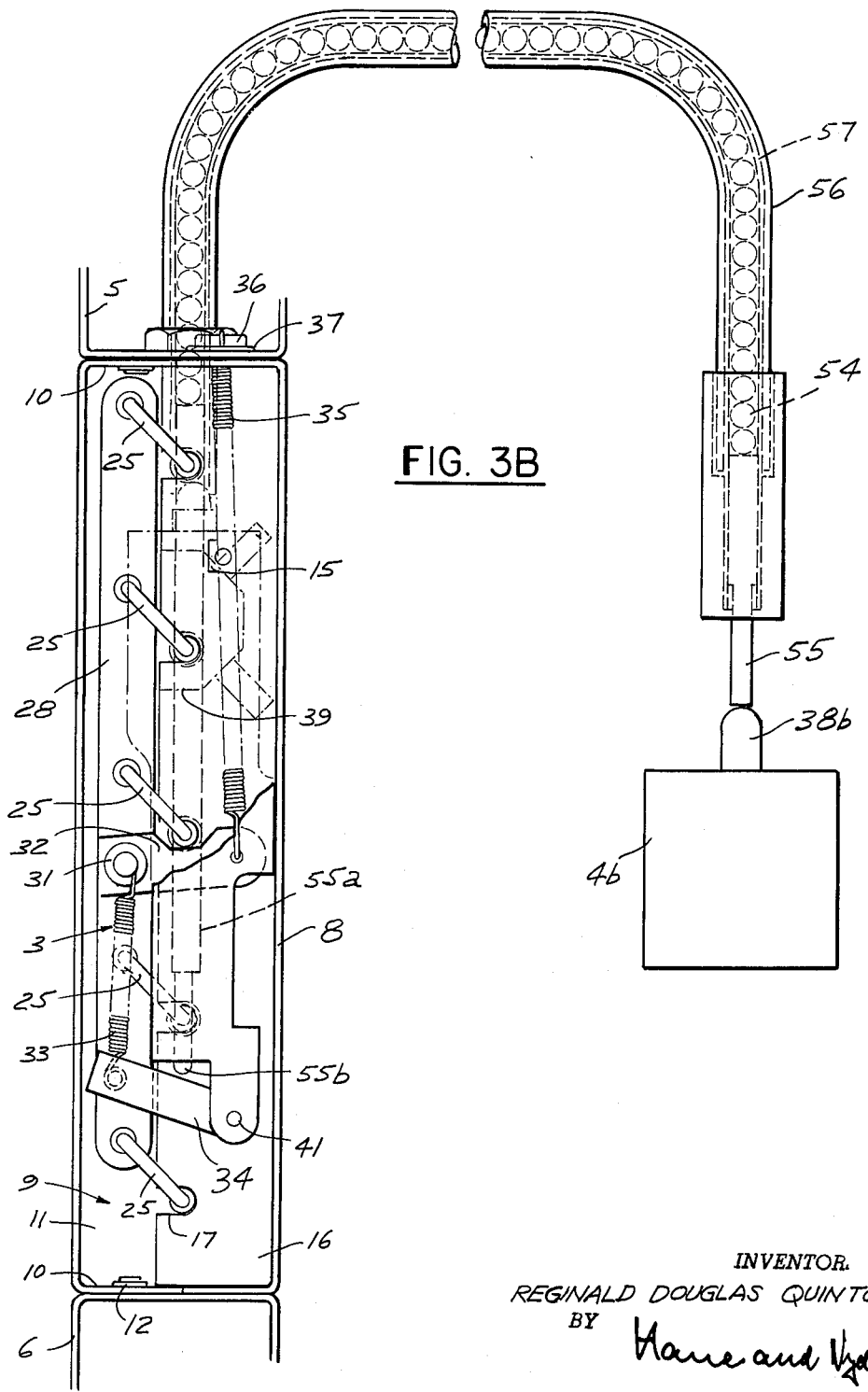
FIGURE 3B is another modification of the mechanism shown in FIGURE 3.

According to FIG. 3B a diagrammatically shown thermostat 4b is mounted spaced apart from the frame assembly. The temperature controlled arm 38b of the thermostat acts via a pin 55 upon a transmission means in the form of a flexible tube 56. A plurality of spheres 54 transmit a displacement of pin 55 to pins 55a and 55b which in turn act upon lever 34. A low friction liner 57 within the tube facilitates displacement of spheres 54. The function of the mechanism according to FIG. 3B is the same as that of the mechanism of FIG. 3.

Referring now to the radiator shutter mechanism of FIGURES 9 to 16, the mechanism includes a frame assembly having upper and lower members 101 and 102 respectively, which are joined at one end to a cross-member 103 by brackets 104, and are joined at the other the other end to a cross-member 105 by similar brackets 106.

Each of the brackets has a plate 107 attached to the respective member 101 or 102 at a flange 108 of the member. Extending from the plate are flanges 109 and 110 attached respectively to flanges 111 and 112 of the appropriate member 103 or 105.

The brackets are attached to the various members by spotwelding but may be attached by any other suitable means. The members 101, 102 and 103 are of generally channel cross-section and the member 104 of generally angle cross-section but any suitable cross-section may be adopted. Bottom flanges 113 of the members 101 and 102 are slotted at 114 for enabling the frame assembly to be bolted to the radiator.

Secured to the flange 111 of the member 105 is a scalloped plate 115, again, for example, by spotwelding. To this plate is fixed, as by screws 116, the flange 117 of a cross-member 118. This cross-member may also be of angle section.

The free edges of the flanges 111 and 117 include five semi-circular recesses, the flanges being positioned relative to each other so that the recesses of the one register with the recesses of the other. In the housings so formed are positioned bushes 119. Similar bushes 120 are mounted in apertures provided in the flange 111 of the member 103.

There are provided five vane assemblies, each generally indicated at 121 and taking a similar form to the like assemblies in the first described embodiment. Rods 122 and 123 of the assemblies are supported in the bushes 120 and 119 respectively.

At the end "A" of the mechanism, there is a cover 124 suitably, for example, of a generally angle cross-section, having a marginal part 124a bent to lie on the upper flange 125 of the cross-member 103, and a tongue 126 shaped to engage within a retaining lip 127 of the flange 112 of the cross-member. The part 124 is attached to the cross-member by screws 128. It is found that the engagement of the retaining lip with the tongue provides a rattle-free connection. As will be appreciated, the cover 124 can be quickly fitted to the cross-member by clipping the tongue in place and then screwing down the marginal part 124a.

Covers 129 and 130 which are similar in cross-section to the cover 124 are provided at the end "B" of the mechanism. The covers 129 and 130 are shaped to lie on the upper flange 131 of the cross-member 118 and are attached to that flange by pairs of screws 132 and 133 respectively, and each has a tongue 134 which engages within a retaining lip 135 of the flange 112 of the cross-member 105. When in position the cover 130 lies vertically above the cover 129, this cover having an angle plate on which the cover 130 rests. The covers can be fitted similarly to the cover 123.

The cover 129 carries a wax hydraulic thermostat 136, which is adapted to be connected into the engine cooling system at inlet and outlet ports 137. The piston of the thermostat is arranged to act on a cranked rod 138, axial movement of which, as will be explained, effects pivoting of the vanes so that the vanes allow an air stream to pass to the radiator matrix and control such air stream in dependence on cooling water temperature.

A generally channel shaped housing 139 is attached at its base 140 to the flange 112 of the cross-member 105. One flange of the housing is recessed at 161 for receiving the ports 137 of the thermostat which is a clip fit as shown between the opposed flanges of the housing and sits with its piston head opposite the straight portion 138a of the cranked rod 138. This portion is guided in bearing bushes 141 which are positioned in an angle 142 attached to the base 140 and a flange 143 turned up from the base and are retained by clips 144.

The cranked end of the rod 138 is screwed into a spring 145 which is anchored at its other end to a peg 146 projecting a T-piece 147. This T-piece is attached to a link 148 in which are mounted bearing bushes 149. These bushes are arranged with their heads between the link and the scalloped plate 115 and are carried on the rods 123 which as part of the vane assemblies are similar in construction to the like parts in the previously described embodiment. The bushes may also be arranged alternatively as in that embodiment so that bush heads are positioned alternatively to one side of the link and then to the opposite side, the link thereby being prevented from making metal-to-metal contact with adjacent parts during its operating movement.

Such movement is effected by axial motion of the cranked rod 138 which is transferred to the link through the spring 145 and T-piece 147. As will be realised the link is not guided for movement in a linear path and can float to accommodate for the pivotal movement of the rods 138. Operating movement of the link turns the rods 123 thereby to pivot the vanes into an open position.

Return of the link to close the vanes is effected by a return spring 150 which is anchored at one end of the peg 146 to lie inwardly of the spring 145 and at the other end to a peg 151 carried by a plate 152 attached to the inner flange 153 of the housing 139.

The attachment may be by spotwelding as also may that between the housing base 140 and the flange 112, the angle 142 and the base, and the T-piece 147 and the link 148. Other forms of attachment may also be adopted.

Since the rod 138 is cranked, it is able to accommodate for any turning movement imparted to it by the piston of the thermostat, the rod turning to suit and thereby twisting the spring 145. Since the rod is threaded to the spring the spring tension may be adjusted.

The bearing bushes 119, 120 and 149 may be of any suitable synthetic bearing material and are preferably of nylon. The bearing bushes 141 may also be of any suitable bearing material and preferably of polytetrafluoroethylene.

I claim:

1. A radiator shutter mechanism for controlling a flow of air to a radiator matrix of a liquid cooled engine in accordance with the operational temperature of the coolant in said radiator matrix, said shutter mechanism comprising a frame structure including spaced apart opposite side members, one of said side members being constituted of two parts disposed side by side in a common plane, each of the two adjacent edges of said parts including a recess, the two recesses being in registry to form a split bearing, and a vane including a lengthwise groove in one of its sides, and a pair of pivot rods placed in said groove, each of said pivot rods protruding from one side of said vane, one of said protruding rod portions being journalled in said split bearing and the other being rotatably supported by said frame structure, the side walls of said groove including deformed portions overlying said rods at least partly to retain the same in the groove and at least one of the rod portions within the groove being kinked to prevent rotation of the respective pivot rod in reference to the vane.

2. A radiator shutter mechanism for controlling a flow of air to a radiator matrix of a liquid cooled engine in accordance with the operational temperature of the coolant in said radiator matrix, said shutter mechanism comprising a frame structure including spaced apart opposite side members, one of said side members being constituted of two parts disposed side by side in a common plane, each of the two adjacent edges of said parts including a recess, the two recesses being in registry to form a split bearing, a vane including a lengthwise groove in one of its sides, and a pair of pivot rods placed in said groove, each of said pivot rods protruding from one side of said vane, one of said protruding rod portions being rotatably supported by said frame structure, the side walls of said groove including deformed portions overlying said rods at least partly to retain the same in the groove and one of the rod portions within the groove being kinked to prevent rotation of the respective pivot rod in reference to the vane, said kinked pivot rod being journalled in the split bearing and continued into a bent-off, pivot-free end portion, a movable control member coupled to said bent-off portion for controlling the angular position of said control member, and temperature sensitive means arranged to be responsive to the temperature of the coolant in the radiator matrix and coacting with said control member to control the position thereof.

3. A radiator shutter mechanism according to claim 2 wherein said extended pivot portion is generally U-shaped and said control member comprises a floating link engaged by said U-shaped portion.

4. A radiator shutter mechanism according to claim 3 wherein a bearing bush is provided in said floating link, said pivot free end portion engaging said bush, and wherein spacing means are provided on said bush and said pivot free end portion of the respective pivot rod to maintain said floating link spaced apart from said split bearing.

5. A radiator shutter mechanism according to claim 2 wherein an actuating spring couples said temperature sensitive means to said control member for moving the latter, and a return spring is connected to the control member for urging the same into a rest position.

6. A radiator shutter mechanism according to claim 5 wherein said temperature sensitive means comprises a thermostat including a movable piston, the position of said piston being controlled by the coolant temperature as detected by said thermostat, said piston abutting against said control member for controlling the position thereof, and wherein a mounting plate is secured to said control member, said actuating spring coupling said control member to said plate and said return spring being secured on one end to said plate and on the other end to said frame structure.

7. A radiator shutter mechanism according to claim 1 wherein said frame structure comprises an upper and lower member, one of the parts of said one side member being detachably secured to said upper and lower frame members.

8. A radiator shutter mechanism according to claim 7 wherein the other of said side members of said frame structure includes a bush having a flanged head, the other pivot rod being journalled in said bush, and wherein said head of the bush spaces the vane from said other side member.

9. A radiator shutter mechanism according to claim 1 wherein a plate is secured to one of the side member parts forming said split bearing to provide additional support for the same.

10. A radiator shutter mechanism according to claim 2 wherein said temperature sensitive means comprises a thermostat including a movable piston, the position of said piston being controlled by the coolant temperature as detected by the thermostat, and comprising a displaceable cranked rod engaged by said piston to control the position of said crank rod by the position of said piston, and an actuating spring screw threaded to said cranked rod and connected to said control member whereby the angular position of the vane is controlled by the position of said piston.

11. A radiator shutter mechanism according to claim 10 wherein said frame structure comprises an upper and a lower member secured to said side members, and wherein a mounting plate is secured to said control member, said actuating spring being secured on one end to said plate and on the other end to one of said upper and lower members.

12. A radiator shutter mechanism according to claim 11 wherein one of the parts of said one side member is detachably secured to said upper and lower members of the frame structure.

13. A radiator shutter mechanism according to claim 12 wherein said one side member part is further secured to a mounting plate.

14. A radiator shutter mechanism according to claim 1 wherein one of said side members has a channelled side member forming a retaining lip, the other side member having an angular cross section, and comprising a cover disposed on the side of the frame structure having said side member of angular cross section, said cover including a tongue engaging said retaining lip and a flange overlying one of the branches of said side member of angular cross section.

15. A radiator shutter mechanism according to claim 2 wherein said temperature sensitive means comprises a thermostat and a housing for the thermostat, said housing being secured to one of said side member parts.

16. A radiator shutter mechanism according to claim 2 wherein said temperature sensitive means is mounted spaced apart from said frame structure, and wherein a transmission means transmits the indications of said temperature sensitive means to said vane to control the angular position thereof;

17. A radiator shutter mechanism according to claim 16 wherein said transmission means comprises a flexible cable.

18. A radiator shutter mechanism according to claim 16 wherein said transmission means comprises a tube and a plurality of indications transmitting balls in said tube.

References Cited by the Examiner
UNITED STATES PATENTS

| | | | |
|---|---|---|---|
| 595,854 | 12/97 | Lansing | 20—62 |
| 664,764 | 12/00 | Van Koehring | 73—362.2 |
| 1,411,487 | 4/22 | Giesler | 236—35.2 |
| 1,542,407 | 6/25 | Raleigh | 236—35.2 |
| 1,561,311 | 11/25 | Craig | 126—292 |
| 1,576,507 | 3/26 | Eliasek | 189—62 |
| 1,979,810 | 11/34 | Peterson | 236—35.3 |
| 2,751,154 | 6/56 | Valtersson et al. | 236—35.2 |
| 2,805,027 | 9/57 | Ferris | 236—35.2 |
| 3,115,223 | 12/63 | Shustrom | 189—62 |
| 3,125,944 | 3/64 | Radcliff | 98—110 |

FOREIGN PATENTS

| | | |
|---|---|---|
| 320,786 | 10/29 | Great Britain. |
| 337,026 | 4/59 | Switzerland. |

WILLIAM F. O'DEA, *Acting Primary Examiner.*
ALDEN D. STEWART, EDWARD J. MICHAEL,
*Examiners.*